(12) United States Patent
Dickinson et al.

(10) Patent No.: US 6,503,860 B1
(45) Date of Patent: *Jan. 7, 2003

(54) ANTIMONY OXIDE GLASS WITH OPTICAL ACTIVITY

(75) Inventors: James E. Dickinson, Corning, NY (US); Adam J. G. Ellison, Corning, NY (US); Alexandre M. Mayolet, Chartres (FR); Michel Prassas, Vulaines S/Seine (FR)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/499,010

(22) Filed: Feb. 4, 2000

Related U.S. Application Data

(63) Continuation-in-part of application No. 09/288,454, filed on Apr. 4, 1999, now Pat. No. 6,410,467.
(60) Provisional application No. 60/081,073, filed on Apr. 8, 1998.

(51) Int. Cl.[7] ................................................. C03C 3/12
(52) U.S. Cl. ............................ 501/41; 501/42; 501/43; 501/49; 501/50; 501/52; 501/54; 501/56; 501/57; 501/58; 501/59; 501/64; 501/65; 501/66; 501/68; 501/69; 501/70; 501/72; 501/73; 501/77; 501/78
(58) Field of Search ................................ 501/37, 41–43, 501/49, 50, 52, 54–59, 64–66, 68–70, 72, 73, 77, 78

(56) References Cited

U.S. PATENT DOCUMENTS

| | | | |
|---|---|---|---|
| 2,918,382 A | * | 12/1959 | King, Jr. et al. |
| 3,677,960 A | * | 7/1972 | Ishiyama |
| 3,714,059 A | * | 1/1973 | Shaw et al. |
| 3,729,690 A | | 4/1973 | Snitzer |
| 4,239,645 A | * | 12/1980 | Izumitani et al. |
| 4,248,732 A | * | 2/1981 | Myers et al. |
| 4,674,835 A | | 6/1987 | Mimura et al. |
| 4,962,067 A | * | 10/1990 | Myers |
| 5,027,079 A | | 6/1991 | Desurvire et al. |
| 5,239,607 A | | 8/1993 | da Silva et al. |
| 5,274,728 A | | 12/1993 | Tran |
| 5,283,211 A | * | 2/1994 | Aitken et al. |
| 5,483,628 A | | 1/1996 | Borrelli et al. |
| 5,537,505 A | | 7/1996 | Borrelli et al. |
| 5,563,979 A | | 10/1996 | Bruce et al. |
| 6,128,430 A | * | 10/2000 | Chu et al. |

FOREIGN PATENT DOCUMENTS

| | | | |
|---|---|---|---|
| DE | 2831908 A | * | 1/1980 |
| JP | 03-218945 A | * | 9/1991 |
| JP | 11-236245 A | * | 8/1999 |

OTHER PUBLICATIONS

Yamada et al. "Flattening the gain spectrum of and erbium–doped fibre amplifier by connecting an $Er^{3+}$doped $SiO_2$–$Al_2O_3$ fibre and an $Er^{3+}$doped multicomponent fibre" Electronics Letters, vol. 13, No. 21, 13th Oct. 1994, pp. 1762–1764.

* cited by examiner

*Primary Examiner*—David Sample
(74) *Attorney, Agent, or Firm*—Svetlana Z. Short; Patricia L. Ades

(57) ABSTRACT

According to one aspect of the present invention an optically active glass contains $Sb_2O_3$, up to about 4 mole % of an oxide of a rare earth element, and 0–20 mole % of a metal halide selected from the group consisting of a metal fluoride, a metal bromide, a metal chloride, and mixtures thereof, wherein this metal is a trivalent metal, a divalent metal, a monovalent metal, and mixtures thereof. In addition, any of the glass compositions described herein may contain up to 15 mole % $B_2O_3$ substituted for an equivalent amount of $Sb_2O_3$.

17 Claims, 4 Drawing Sheets

ANTIMONY OXIDE GLASS WITH OPTICAL ACTIVITY

CROSS-REFERENCE TO RELATED APPLICATIONS

This is a continuation-in-part of U.S. patent application Ser. No. 09/288,454 filed on Apr. 4, 1999 now U.S. Pat. No. 6,410,467, which claims the benefit of U.S. Provisional Patent Application No. 60/081,073, filed Apr. 8, 1998; which the content of which is relied upon and incorporated herein by reference in its entirety, and the benefit of priority under 35 U.S.C. § 120 is hereby claimed.

BACKGROUND OF THE INVENTION

1. Field of the Invention

The present invention relates generally to antimony oxide-containing glass compositions and, more particularly, to optically active antimony oxide-containing glasses that are made optically active by being doped with a rare earth element; their use in optical amplifying devices and optical amplifying devices incorporating these compositions; and methods for making the glass compositions of the invention. As used herein, the term "optically active" refers to a rare earth doped glass capable of stimulated emission for amplifying a light signal when the glass is excited by a suitable pumping source.

2. Technical Background

It is known that single mode optical fibers doped with low levels of rare-earth ions can be drawn from heavy metal fluoride glasses. Unfortunately, heavy metal fluoride glasses suffer certain undesirable attributes that have restricted their applications. Most notably, heavy metal fluoride glasses exhibit poor resistance to devitrification. U.S. Pat. No. 4,674,835 discusses the crystallization problems of heavy metal fluoride glasses, one example of which is referred to as ZBLAN, and the light scattering problems resulting therefrom. The susceptibility of heavy metal fluoride glasses to devitrification generates problems in making large preforms. Crystallization in the preform causes difficulties during the formation of optical fibers by commonly used methods. Heavy metal fluoride glasses are quite prone to inhomogeneous nucleation, which leads to crystallization at the core and cladding interfaces during the drawing of the optical fiber. The resulting crystals in the fibers cause serious light scattering losses.

Devitrification of the heavy metal fluoride glasses is aggravated when ions necessary to impart differences in indices of refraction to the core and cladding are added to the glass composition. Additional doping, for example, with rare earth metal ions, also tends to reduce the stability of the glass. As a consequence of those problems, research has focused on finding additives to a base fluoride glass composition that will reduce the tendency of the glass to devitrify and to increase the chemical stability thereof. However, the preparation of fluoride glasses requires that the glass forming components be reheated at high temperatures. Furthermore, these glasses cannot be melted in air but require a water-free, inert gas environment.

Most oxide glasses such as, for example, silicon dioxide, are easier to prepare, more chemically and mechanically stable, and more easily fabricated into rods, optical fibers, or planar waveguides than are fluoride glasses. Addition of even small amounts of oxides into fluoride glasses to improve their stability significantly quenches their upconversion luminescence.

Rare earth-doped glasses have found frequent use for the fabrication of light-generating and light-amplifying devices. For example, U.S. Pat. No. 3,729,690 describes a laserable glass comprising a host material that contains a fluorescent trivalent neodymium ingredient. U.S. Pat. No. 5,027,079 discloses an optical amplifier comprising a single mode fiber that has an erbium-doped core. U.S. Pat. No. 5,239,602 discloses an apparatus and method for flattening the gain of an optical amplifier that utilizes an erbium-doped silica fiber having a germanosilicate core. U.S. Pat. No. 5,563,979 discloses an erbium-doped planar optical device whose active core includes a mixture of oxides such as lanthanum and aluminum oxides. The inclusion of antimony oxide in glasses for optical devices is also reported. One reference describes a glass for use in waveguides that contains 50–75 mole % $Sb_2O_3$.

For the construction of efficient optical amplifiers, there remains a need for new, readily prepared glasses that display an optimal combination of gain flatness and breadth. This need is well met by the glass of the present invention.

SUMMARY OF THE INVENTION

According to one aspect of the present invention an optically active glass contains $Sb_2O_3$, up to about 4 mole % of an oxide of a rare earth element, and 0–20 mole % of a metal halide selected from the group consisting of a metal fluoride, a metal bromide, a metal chloride, and mixtures thereof, wherein this metal is a trivalent metal, a divalent metal, a monovalent metal, and mixtures thereof. In addition, any of the glass compositions described herein may contain up to 10 mole % $B_2O_3$ substituted for an equivalent amount of $Sb_2O_3$.

Although the glass of the present invention is highly desirable because it can be fabricated in air using standard melting techniques and batch reagents, when the glass contains about 90% or more of $Sb_2O_3$ it is formed by the techniques of splat quenching or roller quenching. The glass composition of the present invention exhibits a gain spectrum with excellent breadth and flatness characteristics and can be readily modified for specific optical amplifier applications.

Further in accordance with the present invention is an optical energy producing or light-amplifying device, in particular an optical amplifier or laser, that comprises the glass of the invention. The optical amplifier can be either a fiber amplifier or a planar amplifier, either of which may be of a hybrid (composition) construction.

DETAILED DESCRIPTION OF THE PREFERRED EMBODIMENTS

Figure 1A:
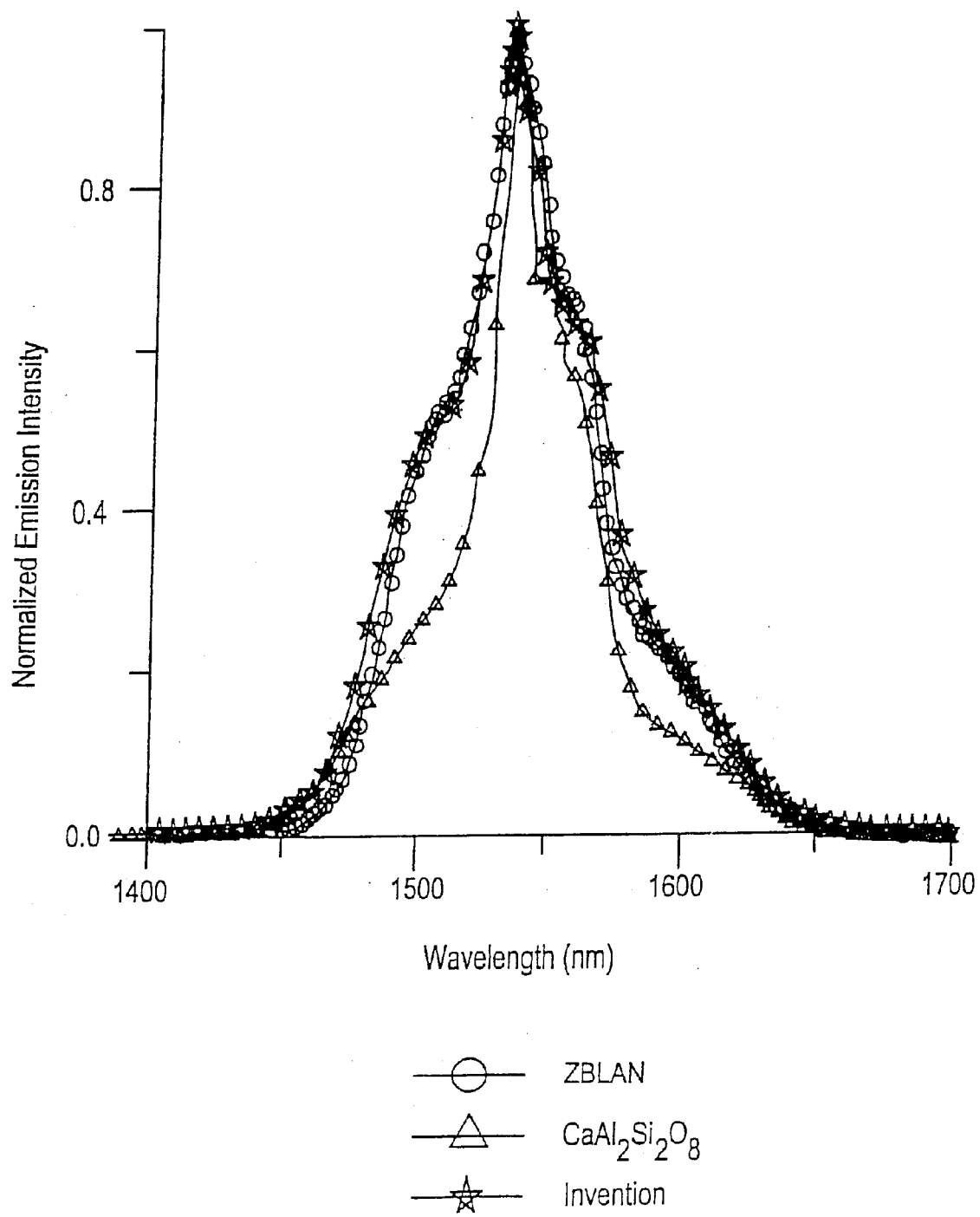
FIG. 1A is a graph comparing the emission spectra from 1400 nm to 1700 nm of an aluminosilicate glass, a fluoride glass (ZBLAN), and an erbium-doped, antimony-containing glass of the invention.

The optically active glass of one embodiment of the present invention, expressed in mole percent on an oxide basis, comprises $Sb_2O_3$ and up to about 4 mole % of an oxide of a rare earth element. The glass preferably comprises 0.5–99 mole % $Sb_2O_3$, and preferably about 0.01–0.4 and preferably 0.05 to 0.2 mole % of rare earth element oxide, such as, $Er_2O_3$ for example. The glass preferably comprises a remainder of one or more compatible metal oxides.

In one embodiment, the optically active glass consists essentially of $Sb_2O_3$ and up to about 4 mole % $RE_2O_3$, where RE is an oxide of a rare earth element. Although erbium is the especially preferred rare earth element, the glass may comprise other rare earth elements to impart optical activity to the glass as defined herein, as further described below.

It will be appreciated by those skilled in the art that the rare earth element plays no part in forming the glass per se. Thus an embodiment of the invention is a glass consisting essentially of $Sb_2O_3$.

The glass of the invention can further comprise 0–99 mole % $SiO_2$, 0–99 mole % $GeO_2$, and 0–75 mole % $Al_2O_3$ or $Ga_2O_3$.

In an aspect of each of the embodiments of the invention, up to 15 mole % $B_2O_3$ can be substituted for an equivalent amount of $Sb_2O_3$. While $B_2O_3$ reduces the lifetime of erbium envision at 1530 nm, its advantage is that it reduces the lifetime of the 980 pumping level ($\tau_{32}$) at a faster rate.

The glass of the invention can further comprise 0–45 mole % $A_2O$, where A is Li, Na, K, Rb, Cs, or mixtures thereof, and/or 0–45 mole % MO, where M is Mg, Ca, Sr, Zn, Ba, Pb, or mixtures thereof:. The rare earth element is Y, La, Ce, Pr, Nd, Pm, Sm, Eu, Gd, Tb, Dy, Ho, Er, Tm, Yb, Lu, or mixtures thereof, and Scandium (Sc) may be substituted for a rare earth in an embodiment of the invention. In one embodiment of the present invention, the glass comprises 50–72 mole % $SiO_2$, 0–20 and preferably 0–6 mole % $Al_2O_3$, 2–35 and preferably 10 to 30 mole % $Sb_2O_3$, 0–5 mole % $K_2O$, and 0.01–0.2 mole % $Er_2O_3$.

In another embodiment of the present invention, the glass comprises 10–95 mole % $SiO_2$, 0–30 mole % $Al_2O_3$, 3–90 mole % $Sb_2O_3$, and 0.01–2 mole % $Er_2O_3$.

In another embodiment of the present invention, the glass further comprises a metal fluoride, bromide, chloride, or mixtures thereof. The metal fluoride can be incorporated for the purpose of insuring that the glass has low water content. However, it should be stated that dry glass with and glass with optimal erbium spectroscopy can be produced without incorporation of metal halides. The metal forming the metal halide can be a trivalent, divalent, or monovalent metal, or mixtures thereof. In a further preferred embodiment, the metal halide is a metal fluoride such as $AlF_3$, $CaF_2$, KF, or mixtures thereof. The (metal fluoride)/(metal fluoride+total oxides) molar fraction of the glass is preferably about 0.01 to 0.25, more preferably about 0.1 to 0.2.

In yet another embodiment of the present invention, the glass comprises 50–72 mole % $SiO_2$, 0–20 mole % and preferably 0–6 mole % $Al_2O_3$, 2–35 mole % $Sb_2O_3$, 0–20 mole % and preferably 0–5 mole % $K_2O$, and about 0.1 mole % $Er_2O_3$, and further includes 0.1–20 mole % of a metal halide.

Further in accordance with the present invention is an optical energy-producing or -amplifying device. Preferably, the device is an optical amplifier comprising the rare earth element-doped, antimony oxide containing glass described above. The optical amplifier can be either a fiber amplifier or a planar amplifier, as described in, for example, U.S. Pat. Nos. 5,027,079, 5,239,607, and 5,563,979, the disclosures of which are incorporated herein by reference. The fiber amplifier can further be of a hybrid structure that combines legs formed from a glass of the invention with legs formed from a standard aluminosilicate glass, as described, for example, in M. Yamada et al., "Flattening the gain spectrum of an erbium-doped fiber amplifier by connecting an $Er^{3+}$-doped $SiO_2$—$Al_2O_3$ fiber and an $Er^{3+}$-doped multicomponent fiber," Electronics Lett., 30, pp. 1762–1764 (1994), the disclosure of which is incorporated herein by reference.

As discussed in the commonly-assigned, previously-filed, co-pending U.S. Pat. application Ser. No. 60/081,073, filed on Apr. 8, 1998, the disclosure of which is incorporated herein by reference, the local bonding environments of rare earth elements ("REE") in glasses determine the characteristics of their emission and absorption spectra. Several factors influence the width, shape, and absolute energy of emission and absorption bands, including the identity of the anion(s) and next-nearest-neighbor cations, the symmetry of any particular site, the total range of site compositions and symmetries throughout the bulk sample, and the extent to which emission at a particular wavelength is coupled to phonon modes within the sample. Fluoride glasses are useful hosts for optically active REE, because the fluorine atoms surrounding the REEs substantially impact REE emission and absorption spectra. The extreme electronegativity of fluorine lifts the degeneracy of the electronic states of the REE, producing emission and absorption bands that differ substantially from those produced in oxide hosts, being broader and having different relative intensities and, sometimes, different positions. The emission bands are often blue-shifted relative to their positions in oxide glasses. In general, the absolute position and width of an emission or absorption band shifts to lower energy as the electronegativity of the surrounding anions decreases: for example, the total bandwidth of the $Er^{3+}$ 1530 nm emission band in fluoride glasses, such as ZBLAN, is greater than in nearly any oxide glass, and the high-energy edge of the emission band in a fluoride glass is at a higher energy than in an oxide glass. In certain systems, such its hybrid oxyfluoride glasses, it is possible to obtain much of the bandwidth and gain flatness of a fluoride glass by creating environments for the REE that are a combination of oxide and fluoride-like sites.

For optical amplifier applications, the region over which a convolution of the emission and absorption is the flattest is the optimal window through which to pass signals. Because both the position of the overall emission bands and the structure within the band vary from fluoride to oxide hosts, the window with optimal gain flatness also varies. Ideally, one would like to obtain the broadest emission possible in a single glass.

Relative to oxide glasses, fluoride glasses also can accommodate very high concentrations of REE without incurring nonradiative losses resulting from energy transfer between the REE. However, fluoride glasses are prepared under controlled atmospheres; they have extremely high coefficients of thermal expansion and are environmentally unstable compared to many oxide glasses, which complicates their use in practical applications. It is desirable to have glasses with bonding environments for rare earth elements that produce spectoscopic attributes comparable to, or improving upon fluoride glass hosts, while retaining the physical and chemical characteristics of oxide glasses.

As noted above, glasses having broad, flat emission spectra are highly desirable for optical amplifier applications. A flat emission spectrum is defined as one having less than 10% gain ripple over bands (or windows) up to 38 nm wide. Inclusion of fluorine in a glass results in improved dispersal of the REE throughout the glass, which facilitates higher REE loadings without degradation of lifetime. Higher concentrations of REE that are dispersed in separate locations and are thus unable to physically interact with each other are believed possible. The REE include Y, La, Ce, Pr, Nd, Pm, Sm, Eu, Gd, Tb, Dy, Ho, Er, Tm, Yb, and Lu. It is noted that scandium may be substituted for a rare earth element. In accordance with one aspect of the present invention, Er is especially preferred.

The REE ions are highly soluble in the glasses of the present invention, which allows higher loadings of REE. Accordingly, the use of the glass of the invention makes it possible to reduce the size of an optical amplifier because less waveguide material for the same amount of gain is required. Furthermore, because the glass of the present invention can provide quantum efficiency upon radiation substantially equal to 100%, less powerful pump lasers are required to generate fluorescent emission. Useful fluorescent emission maxima are in the range of about 1.3 $\mu$m to about 1.8 $\mu$m. Fluorescent emission maxima of Er-doped glasses are typically in the range of about 1.5 $\mu$m to about 1.6 $\mu$m.

As is well known in the art, Er-doped amplifiers are typically pumped in the 980nm or 1480nm wavelength band. In a preferred aspect of an optical amplifier embodiment of the invention for signal amplification in the 1500 nm telecommunications window (C-band) and/or in the extended erbium spectrum from about 1565–1610nm (L-band), pumped at 980nm, up to 15 mole % $B_2O_3$ (and preferably 0 to 8 mole %) is substituted for an equivalent amount of $Sb_2O_3$. As stated above, the $B_2O_3$ reduces the $\tau_{32}$ lifetime, which is advantageous for pumping an erbium-doped optical amplifier made from the glass compositions of the invention at 980nm. In a further preferred aspect of an optical amplifier embodiment of the invention, up to 15 mole % $As_2O_3$ (arsenic-trioxide), up to 15 mole % $Tl_2O$ (thallium oxide), up to 15 mole % $In_2O_3$ (indium oxide), and up to 15 mole % $Bi_2O_3$ (bismuth trioxide), can be included in the compositions of the invention to modify physical properties such as refractive index and viscosity with no adverse effect on amplifier performance.

Substitutions of germanium and lead for silicon or gallium for aluminum can be used to modify glass forming temperatures, viscosity curves, expansivity, and refractive index. Alkali and alkaline earth metals can be included in the glass to vary the refractive index and to increase or decrease thermal expansivity. Glasses containing optically active REE can be co-doped with non-active REE (for example, Er co-doped with La or Y) co-doped with optically active REE (such as Er co-doped with Yb) to improve quantum efficiency. By varying bulk composition, glasses can be formed with variable optical properties, thus affording maximum flexibility.

The glass of the present invention has absorption and emission characteristics that are effectively hybrids of the best characteristics obtained in oxide or fluoride glasses alone. However, unlike fluoride glasses, which must be prepared in an inert atmosphere, embodiments of the glass of the present invention can be fabricated in air using standard melting techniques and batch reagents. In addition, the environmental stability of the hybrid glasses considerably exceeds that of pure fluoride glasses.

The properties of the glass of the present invention make it particularly useful for the fabrication of a variety of optical devices. Provided with a compatible covering or cladding, the glass can be formed into fiber or planar optical amplifiers or lasers. It can be used alone in planar amplifier applications, or in combination with clad glasses for double-crucible fiberization or rod-and-tube redraw. In addition, the emission/absorption spectra of glasses prepared in accordance with the invention may be tailored to "fill in holes" in the gain spectrum of conventional amplifier materials such as silica or ZBLAN, for example, resulting in hybrid amplifiers that provide a greater degree of gain flatness than can be obtained from any of these materials alone. In addition, glasses free of rare earth elements can be prepared with mechanical and viscoelastic properties very similar to those of glasses doped with rare earth elements, but lower refractive indices. These refractive index-adjusted glasses can serve as clad glasses for optically active cores such as in a fiber laser or in a fiber amplifier.

Embodiments of the glass of the invention can generally be produced according to standard techniques for making glasses: providing glass-forming components and treating these components under conditions effective to produce the glass, which generally entails melting the glass-forming components to produce a glass melt, forming the glass melt into a shaped article, which is then cooled. Preferably, the components are melted in air at a temperature of about 1300–1700° C. for about 2 hours to about 20 hours to produce the glass melt. Next, the glass melt is formed into a shaped article by forming procedures such as, for example, rolling, pressing, casting, or fiber drawing. A shaped article such as, for example, a patty, rod, or sheet, is cooled and then annealed at a temperature of about 350–450° C. for about 0.5 hour to 2 hours. After the final heat treatment, the shaped article is allowed to cool to room temperature.

Certain embodiments of the glass compositions of the present invention, namely those including about 90 mole % or more $Sb_2O_3$, were prepared by splat quenching or roller quenching. Since antimony is not compatible with platinum, the high content antimony oxide glasses of the invention are melted in silica or alumina crucibles. During heat up, some of the $Sb_2O_3$ changes to $Sb_2O_5$, and on cooling forms the very refractory crystalline phase cervantite, $Sb_2O_4$. This problem is alleviated by splat and/or roller quenching as described in Examples 1–3, below. A possible alternative is to melt $Sb_2O_3$ in a dry box, or in sealed silica ampules, known to those skilled in the glass forming art.

Table I lists some preferred exemplary compositional embodiments of the invention. The numerical values are in moles %.

TABLE I

| $Sb_2O_3$ | $SiO_2$ | $GeO_2$ | $Al_2O_3$ | $B_2O_3$ | $Ga_2O_3$ | $Cs_2O$ | $In_2O_3$ | $Na_2O$ | $K_2O$ | F | $RE_2O_3$ |
|---|---|---|---|---|---|---|---|---|---|---|---|
| 90 | 9.9 | | | | | | | | | | 0.1 |
| 90 | 94.9 | 9.9 | | | | | | | | | 0.1 |
| 5 | | 94.9 | | | | | | | | | 0.1 |
| 5 | | | | | | | | | | | 0.1 |
| 35 | | | | 25 | | | 38 | | | | 2 |
| 35 | | | | | | 25 | 38 | | | | 2 |

TABLE I-continued

| Sb$_2$O$_3$ | SiO$_2$ | GeO$_2$ | Al$_2$O$_3$ | B$_2$O$_3$ | Ga$_2$O$_3$ | Cs$_2$O | In$_2$O$_3$ | Na$_2$O | K$_2$O | F | RE$_2$O$_3$ |
|---|---|---|---|---|---|---|---|---|---|---|---|
| 75 | | | | | 24.9 | | | | | | 0.1 |
| 30 | | | | | 69.9 | | | | | | 0.1 |
| 99.9 | | | | | | | | | | | 0.1 |
| 30.3 | 60.6 | 3.03 | | 1.52 | | 1.52 | 1.52 | 1.52 | | 1 | 1 |
| 27.77 | | 55.54 | 4.63 | | 4.63 | | 4.63 | 1.4 | 1.4 | 1 | 1 |
| 35 | 50 | 0 | 15 | | | | | | 0 | | 0.1 |
| 15.5 | 74 | 4 | 5 | | | | | | 1.5 | | 0.1 |

EXAMPLES

The following examples further illustrate the preparation of Erbium-Doped, Antimony Oxide-Containing Glass.

Example 1

The following composition

| | |
|---|---|
| Sb$_2$O$_3$ | 99.9 mole % |
| Er$_2$O$_3$ | 0.1 mole % | was prepared as follows: A 25g charge of melt was held at 25–50° C. above its liquidus in a silica crucible until it reached thermal equilibrium, about 10–15 min.

In a preferred method aspect for forming this glass by splat quenching, the charge is delivered to a cold plate (e.g., steel or graphite) and smashed from above by a cold "hammer" (e.g., steel or graphite). With a good configuration, the quench rate is $\geq 250°$ C./sec.

In another preferred method aspect for forming this glass by roller quenching, the charge is delivered between cold rollers (e.g., steel or graphite). Depending upon the thermal conductivity of the sample, the quench rate is $>>1000°$ C./s.

Larger melt samples of the glass can be similarly processed, but the lateral dispersal of the melt in the splat quench limits the largest size that can be handled to about 150 g. The glass in a roller quench operation is delivered as a continuous stream, thus there is no size limit.

Example 2

The following composition

| | |
|---|---|
| Sb$_2$O$_3$ | 90.0 mole % |
| SiO$_2$ | 9.9 mole % |
| Er$_2$O$_3$ | 0.1 mole % | was prepared by splat quenching as described in Example 1, above.

Example 3

The following composition

| | |
|---|---|
| Sb$_2$O$_3$ | 99.0 mole % |
| GeO$_2$ | 9.9 mole % |
| Er$_2$O$_3$ | 0.1 mole % | was prepared by splat quenching as described in Example 1, above.

Example 4

A glass-forming mixture having the following composition (in mole %) is ball-milled and charged into a silica crucible:

| | |
|---|---|
| SiO$_2$ | 55 |
| Al$_2$O$_3$ | 10.4 |
| Al$_2$F$_6$ | 5 |
| K$_2$O | 0.6 |
| K$_2$F$_2$ | 10.5 |
| K$_2$Br$_2$* | 1.5 |
| Sb$_2$O$_3$ | 17 |
| Er$_2$O$_3$ | 0.1 |

*added to eliminate water from final glass

The crucible is covered and at a temperature of about 1425° C. for about 2 hours. The melt is poured onto a steel plate to form a sheet, which is cooled, then placed in an annealing oven and held at a temperature of about 450° C. for about one hour before being allowed to cool gradually to room temperature.

Example 5

A glass-forming mixture having the following composition (in mole %) is ball-milled and charged into a silica crucible:

| | |
|---|---|
| SiO$_2$ | 75.5 |
| Al$_2$F$_6$ | 2 |
| Sb$_2$O$_3$ | 22.5 |
| Er$_2$O$_3$ | 0.1 |
| Fluoride | 2 wt % |

The crucible is covered and heated at a temperature of about 1475° C. for about 6 hours. The melt is poured onto a steel plate to form a sheet, which is cooled, then placed in an annealing oven and held at a temperature of about 450° C. for about one hour before being allowed to cool gradually to room temperature.

Example 6

A glass-forming mixture having the following composition (in mole %) is ball-milled and charged into a silica crucible:

| | |
|---|---|
| SiO$_2$ | 75.5 |
| Al$_2$O$_3$ | 2 |
| Sb$_2$O$_3$ | 22.5 |
| Er$_2$O$_3$ | 0.1 |

The glass is melted at a temperature of 1525° in a silica crucible. After pouring, the glass is then annealed at a temperature of 500° for 1 hour before being allowed to cool gradually to room temperature. The removal of fluoride improves durability and resistance to derititication and phase separation. This greatly diminishes scattering loss at equivalent fiber draw temperatures (1175° C.) from 1 dB/m with $\lambda^{-4}$ wavelength dependence at 2 % F to 0.076 dB/m with no wavelength dependence at wt/0% F.

Spectroscopic Analysis of Glass Samples

The absorption spectra of polished 10×10×20-mm samples of the glass prepared as described in Example 4, an aluminosilicate glass ($CaAl_2Si_2O_8$), and a fluoride glass (ZBLAN) are measured using a Nicolet (Madison Wis.) FT-IR spectrophotometer with 4 $cm^{-1}$ resolution, 256 FID's per sample being collected. The Er fluorescence emission spectra is generated by pumping the 520 nm absorption band with a Xenon lamp, and the 1.5 μm emission is measured using a liquid nitrogen-cooled Si detector together with a SPEX Fluorolog (Edison N.J.) spectrophotometer. Data are collected over the range 1400–1700 nm in 0.5 nm steps, 1.5 seconds/step. Each spectrum is corrected by subtraction of the background, then normalized to a value of 1.0 for the maximum peak intensity.

Figure 1B:
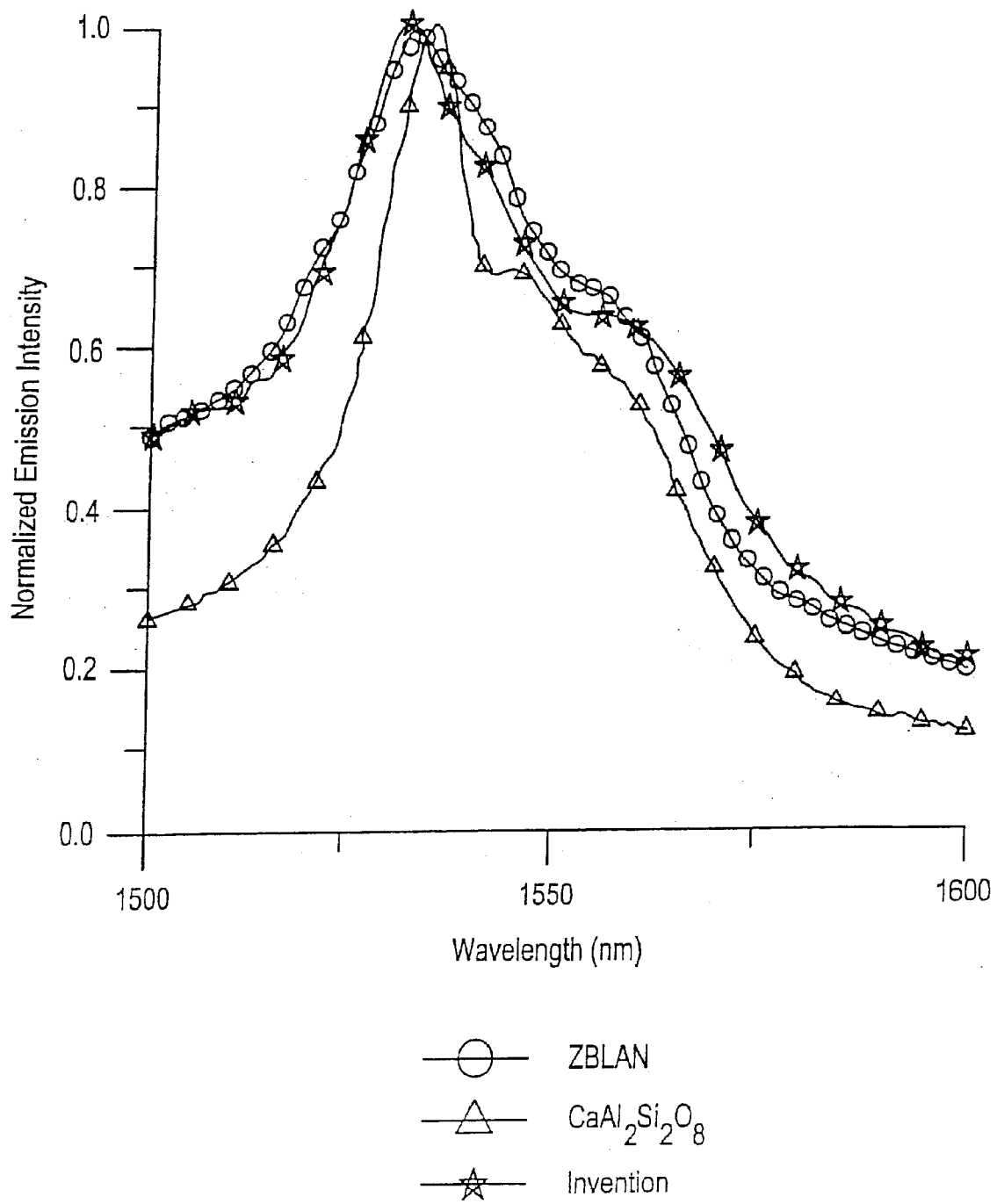
FIG. 1B is a detailed version of FIG. 1A over the range 1500 nm to 1600 nm.

The spectra so obtained for the three samples over the range 1400–1700 nm are depicted in FIG. 1A; a detail for the range 1500–1600 nm is shown in FIG. 1B. The breadth of the spectrum of the glass of the present invention greatly exceeds that of the aluminosilicate glass and also exceeds that of ZBLAN in the peak region around 1530–1560 nm by about 7 nm.

Figure 2:
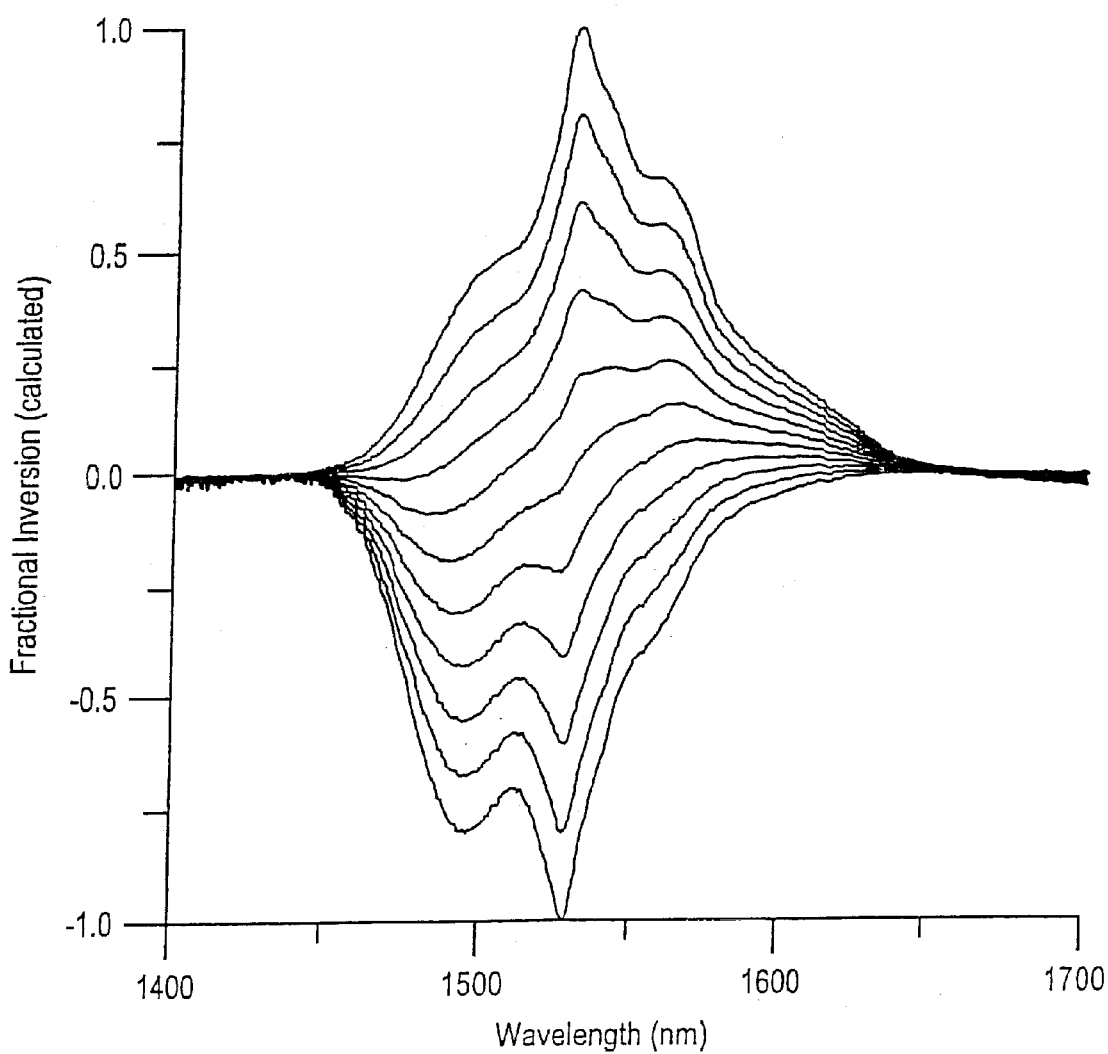
FIG. 2 is a plot of the calculated gain spectra for a glass of the invention.
Figure 3:
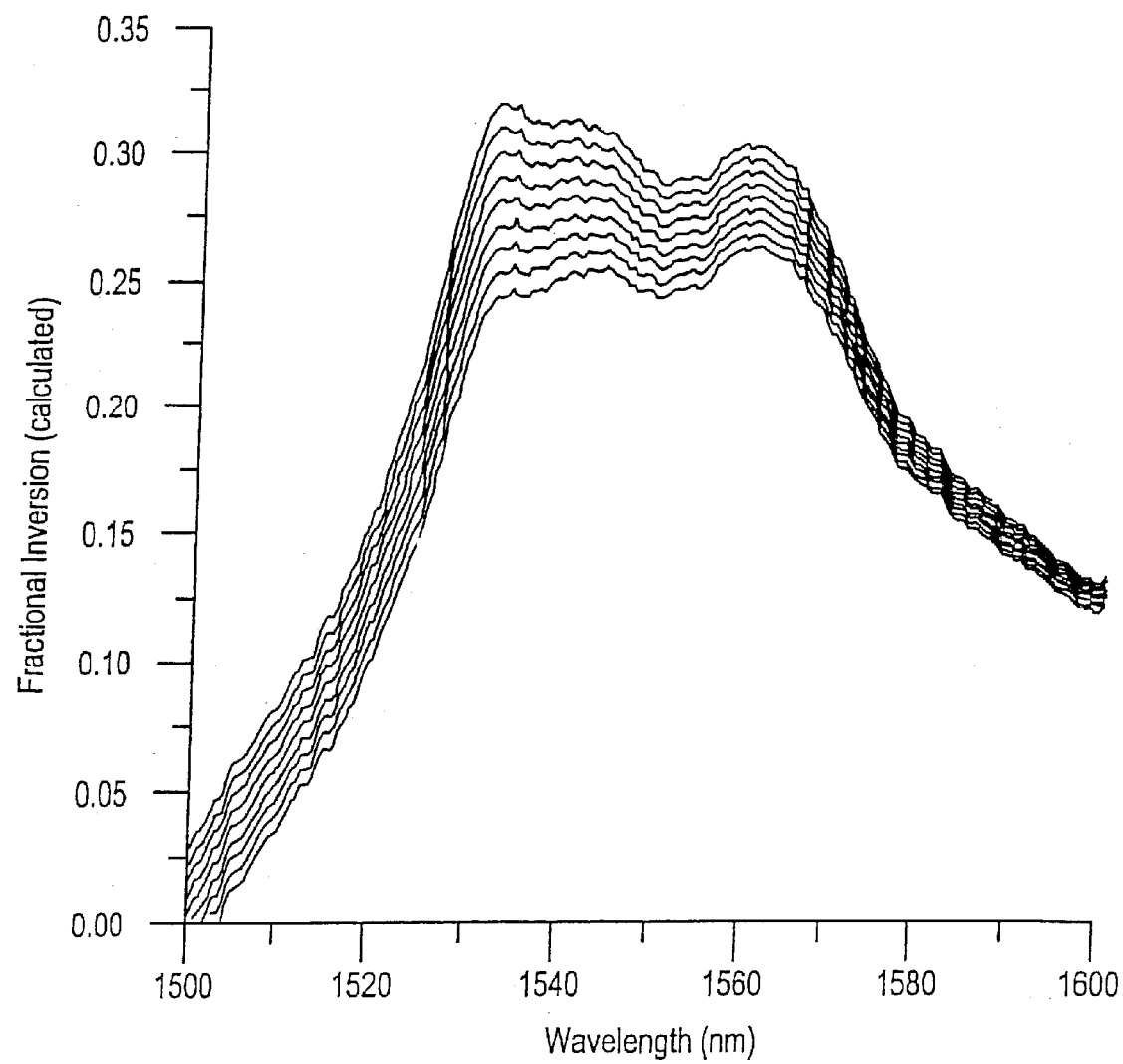
FIG. 3 is a graph of the calculated gain spectra for 61–65% inversion in 0.5% steps for a glass of the invention.

Determination of Gain Flatness for Erbium-Doped, Antimony Oxide-Containing Glass For a sample of the glass prepared as described in Example 4, gain spectra are calculated, in steps of 10%, for levels of inversion ranging from zero to 100%. The plots of the resulting spectra are shown in FIG. 2. Gain spectra are also calculated for inversion levels over the range 61–65%, in steps of 0.5%. The percentages of inversion are calculated assuming that the absolute absorption and emission intensity maxima are of equal magnitude. The resulting plots are shown in FIG. 3.

A figure of merit (FOM) of gain flatness is defined as (MAX−MIN)/MIN, where MAX and MIN are, respectively, the largest and smallest values for gain within a "window," or specified wavelength range. For the glass of Example 4, FOMs are calculated for "floating windows" of widths 30, 35, and 40 nm; the results are shown in Table II.

TABLE II

| Window width (nm) | Wavelength range (nm) | % Inversion | FOM |
|---|---|---|---|
| 30 | 1535–1565 | 63 | 7 |
| 35 | 1530–1565 | 63 | 7 |
| 40 | 1528–1568 | 63.5 | 14.5 |

As shown by the data of Table II, the calculated gain spectra show a very flat response (FOM=7, corresponding to a 7% gain ripple) for the 30 and 35 nm windows, which is substantially maintained for a window of 38 nm width. Even for the 40 nm-wide window, a desirably flat response (FOM=14.5, ca 15% gain ripple) is maintained. These excellent gain flatness results greatly exceed those attainable with previously known silica amplifier materials.

Although the invention has been described in detail for the purpose of illustration, it is understood that such detail is solely for that purpose, and variations can be made therein by those skilled in the art without departing from the spirit and scope of the invention that is defined by the following claims.

What is claimed:

1. An optically active glass (in mole % on an oxide basis), comprising:

(i) equal to or greater than 5 mole % $Sb_2O_3$;

(ii) up to about 4% of at least one of $RE_2O_3$, where RE is a rare earth element;

(iii) greater than 0 to 20 mole % of a metal halide selected from the group consisting of a metal fluoride, a metal bromide, a metal chloride, and a mixture thereof, wherein said metal is a trivalent metal, a divalent metal, a monovalent metal, or a mixture thereof.

2. The glass of claim 1, further comprising a remainder of a compatible metal oxide.

3. The glass of claim 1 wherein $Sb_2O_3$ is equal to or greater than 5–99 mole %.

4. The glass of claim 1 further comprising:

| 0–99 mole % | $SiO_2$; |
|---|---|
| 0–99 mole % | $GeO_2$; and |
| 0–75 mole % | ($Al_2O_3$ or $Ga_2O_3$). |

5. The glass of claim 4 further comprising:

0–75% $A_2O$, where A is selected from the group consisting of Li, Na, K, Rb, Cs, and mixtures thereof.

6. The glass of claim 4, further comprising:

0–15% $As_2O_3$;

0–15% $Tl_2O$;

0–15% $In_2O_3$, and

0–15% $Bi_2O_3$.

7. The glass according to claim 4 further comprising: 0–45 mole % MO, where M is selected from the group consisting of Mg, Ca, Sr, Zn, Ba, Pb, and mixtures thereof.

8. The glass according to claim 4 comprising:

10–95 mole % $SiO_2$, 0–30 mole % $Al_2O_3$, equal to or greater than 5–90 mole % $Sb_2O_3$, and about 0.01–0.2 mole % $Er_2O_3$.

9. The glass according to claim 8 comprising:

50–72 mole % $SiO_2$, 0–20 mole % $Al_2O_3$, equal to or greater than 5–35 mole % $Sb_2O_3$, and about 0.01–0.2 mole % $Er_2O_3$ and further comprising 0–20 mole % $K_2O$.

10. The glass according to claim 8 wherein said glass contains 0 to 5 mole % of metal halide.

11. The glass according to claim 10 wherein said metal halide is a metal fluoride selected from the group consisting of $AlF_3$, $CaF_2$, KF, and mixtures thereof.

12. The glass according to claim 4 having a (metal fluoride)/(metal fluoride+total oxides) molar fraction of about 0.0 to 0.25.

13. The glass according to claim 12 wherein said fraction is about 0.0 to 0.05.

14. The glass of claim 1 wherein 0–15 mole % $B_2O_3$ is substituted for an equivalent amount of $Sb_2O_3$.

15. The glass according to claim 1 wherein the rare earth element is selected from the group consisting of Y, La, Ce, Pr, Nd, Pm, Sm, Eu, Gd, Tb, Dy, Ho, Er, Tm, Yb, Lu, and mixtures thereof.

16. The glass according to claim 15 wherein the oxide of said rare earth element comprises $Er_2O_3$.

17. The glass according to claim 16 further comprising about 0.01–0.4 mole % $Er_2O_3$.

* * * * *